United States Patent Office 3,509,189
Patented Apr. 28, 1970

3,509,189
PROCESS FOR MAKING METHYLENE
BIS(GROUP IIIa METAL HALIDE)
Morris R. Ort, Kirkwood, and Edward H. Mottus, Ballwin, Mo., assignors to Monsanto Company, St. Louis, Mo., a corporation of Delaware
No Drawing. Continuation-in-part of application Ser. No. 620,669, Mar. 6, 1967. This application Sept. 20, 1967, Ser. No. 669,306
Int. Cl. C07f 5/06; C08d 3/04; B01i 11/00
U.S. Cl. 260—448         7 Claims

ABSTRACT OF THE DISCLOSURE

An improved chemical method for making compounds of the formula $X_nMCH_2MX_n$ wherein M is a Group II metal, a Group III–A metal or boron or a Group IV–A metal, X is a chlorine, bromine or iodine atom, and $n$ is one less than the valence of M, e.g., the preparation of the compound methylene bis(aluminum dichloride), $Cl_2AlCH_2AlCl_2$, is described wherein Al is reacted with dichloromethane excluding water. It is preferred to use a small amount of an M and dibromomethane reaction product, iodine or an M bromide to initiate the reaction. Also, it is preferred to use high purity M to avoid contamination of the desired product $Br_2AlCH_2AlBr_2$ and $I_2AlCH_2AlI_2$ are claimed as new compounds and mixtures thereof with $Cl_2AlCH_2AlCl_2$.

---

The invention is a continuation-in-part of copending application Ser. No. 620,669, filed Mar. 6, 1967, now abandoned.

This invention relates to an improved chemical method for producing compounds of the formula $X_nMCH_2MX_n$, e.g., $Cl_2AlCH_2AlCl_2$ where an excess of dichloromethane acts as a solvent for the product. Also the new compounds $Br_2AlCH_2AlBr_2$ and $I_2AlCH_2AlBr_2$ are described and claimed and mixtures of two or three of them.

H. Lehmkuhl and R. Schäfer in Tetrahedron Letters No. 21, pp. 2315–20 (1966) describe a method for making bis(dichloroaluminum) methane and methylene bis (aluminum dichloride) in about 40% yield mixed with polymeric aluminum compounds of the formula

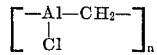

Their method involved reacting aluminum gravel, etched with a little dibromomethane, with boiling dichloromethane. The gray, solid reaction product, suspended in $CH_2Cl_2$, was extracted with boiling $CH_2Cl_2$ to separate the $Cl_2AlCH_2AlCl_2$ from the polymeric product. In Compt. Rend. 188, 1555-7 (1929). Guy Emechiller described the making of $IZnCH_2ZnI$ in low yields; and, this publication refers to a prior publication by the same author where the making of

and $BrMgCH_2MgBr$ are described, namely the publication Compt. Rend. 183, 665 (1926).

In the process of the present invention, it has been found that $Cl_2AlCH_2AlCl_2$ can be made in substantially 100% yield with no substantial amount of polymeric aluminum/methylene dichloride product by carrying out the reaction with dichloromethane and aluminum with substantially no water present, i.e., every practical effort is made to exclude water from the reaction by using drying agents and/or molecular sieve columns to dry all materials involved in the reaction. The reaction can be initiated in the same manner as Lehmkuhl and Schäfer used by a reaction product of dibromomethane and aluminum as described in the examples below, with aluminum tribromide or alternatively by higher temperature under pressure without initiator. It is preferred to use high purity aluminum of the order of 99.9+% to obtain a pure product.

The $Cl_2AlCH_2AlCl_2$ dissolved in dichloromethane, made by the process of the present invention, can be used instead of the $Cl_2AlCH_2AlCl_2$ made electrolytically and described in a copending application Ser. No. 621,036, filed Mar. 6, 1967, as a component of catalysts for polymerizing olefinic compounds as described in the copending application.

If, instead of aluminum in the process of invention, another Group III–A metal or boron, a Group II metal or a Group IV–A metal, i.e., Be, Mg, Ca, Sr, Ba, Ra, Zn, Cd, Hg, B, Ga, In, Tl, Si, Ge, Sn or Pb is used, the corresponding compound $Cl_nMCH_2MCl_n$ is made in high yield wherein M is any of the previously named elements and $n$ is one less than the valence of M. As with aluminum, there must be substantially no water present and it is preferred to use the particular element in high purity. These other $Cl_nMCH_2MCl_n$ can be used as polymerization catalyst components in a similar manner to

If, instead of $CH_2Cl_2$ there is used $CH_2Br_2$ or $CH_2I_2$, the resulting product is $Br_2MCH_2MBr_2$ or $I_2MCH_2MI_2$, respectively. Thus X can be a chlorine, bromine or iodine or a mixture thereof in the same molecular proportions where a mixture of the dihalomethanes is used. The bromine and iodine analogues of the chloro compounds can be used as polymerization catalyst components in a like manner to the chloro.

$Br_2AlCH_2AlBr_2$ and $I_2AlCH_2AlI_2$ claimed as new compounds have some unexpected and advantageous properties as compared to $Cl_2AlCH_2AlCl_2$ claimed in copending application Ser. No. 621,036, filed Mar. 6, 1967. When $Cl_2AlCH_2AlCl_2+VOCl_3+$an alcohol or water catalyst is used to polymerize ethylene, the yields are far superior to those obtained with any other known catalyst operable at low pressure, the molecular weight is very high and the molecular weight distribution of the product is narrow. If it is desired to have a lower molecular weight polyethylene, $H_2$ treatment during the polymerization does give a lower molecular weight; however, it has been found that if $Br_2AlCH_2AlBr_2$ and/or $I_2AlCH_2AlI_2$ is used, instead of or in combination with $Cl_2AlCH_2AlCl_2$, that the molecular weight of the polyethylene can be made even lower. For example, if as little as about 5 mole percent $Br_2AlCH_2AlBr_2$ is used with $Cl_2AlCH_2AlCl_2$ as a polymerization catalyst for ethylene the properties of the polymer are very substantially changed as compared to

alone, and as little as 5 mole percent $I_2AlCH_2AlIB_2$ will we similarly effective. Thus, three catalyst components

$Br_2AlCH_2AlBr_2$ and $I_2AlCH_2AlI_2$ are complementary allowing the entire range of molecular weight in polyethylene to be made from the very highest down to the soft waxes or even liquids with the chloro compound providing the highest, the iodo compound the lowest and the bromo compound in between molecular weights, when polymerizations are carried out under the same conditions with only the Al compound being changed. The iodo compound and the bromo compound are also capable of producing high molecular weight polyethylene if the amount of hydrogen is greatly reduced or omitted entirely.

The invention will be more clearly understood from the following detailed description of specific examples thereof.

EXAMPLE I

This example describes the chemical preparation of methylene bis(aluminum dibromide). The apparatus for the reaction is a 250 ml. flask equipped with a magnetic stirring bar, a reflux condenser and suitable apparatus for nitrogen blanketing. 1.6266 g. (0.0602 g. atom) of 10 mil aluminum sheet, 99.99% pure, was cut into about ⅛″ squares and added to the flask, then 50 ml. of dibromomethane which had been passed through a molecular sieve column to completely dry it and a crystal of iodine were added to the reaction vessel. The contents of the reaction vessel were heated with stirring until an exothermic reaction commenced at which time the heating was stopped and the reaction continued without further heating to completion. Dry nitrogen blanketing was used during the preparation. The reaction mixture was homogeneous and amber in color when hot but as soon as it had cooled, an off-white precipitate settled out, and this precipitate is methylene bis(aluminum dibromide). However, some of the methylene bis(aluminum dibromide) remains in solution.

If, in the experiment of this example, instead of dibromomethane there is used an equimolar amount of diiodomethane, the resultant product is bis(diiodoaluminum)methane; however, it may be desirable to run the diiodomethane reaction at a lower temperature, say ambient temperature or 0° C. or less for optimum yields of the desired product.

EXAMPLE II

Methylene bis(aluminum dichloride) is prepared as follows: Similar equipment is used, as was used for the preparation of the methylene bis(aluminum dibromide) in Example I and 1.6570 g. (0.0614 g. atom) aluminum, 99.99% pure, 150 ml. of dichloromethane which had been dried by passing it through a molecular sieve column and 3.0 ml. of the dibromomethane/aluminum reaction mixture described in Example I which acts as an initiator were added to the reaction flask. The 3.0 ml. of dibromomethane/aluminum reaction product was a representative sample of the material prepared as described in Example I and was obtained by agitating the product to obtain a representative sample of the dispered precipitate in the solvent. Dry nitrogen blanketing was again used during the reaction and the reaction mixture was heated to reflux and maintained at refluxing temperature was 16 hours after which time all of the aluminum was reacted and an amber color solution with only a small trace of flocculent solids was the resulting product. It should be noted that there was only a trace of flocculent solids in the product and the clear amber colored solution containing the desired methylene bis(aluminum dichloride) dissolved therein was separated by decantation from the trace of flocculent solids. Yield was substantially 100% methylene bis(aluminum dichloride).

EXAMPLE III

The reaction vessel used in this experiment was twice as large as that used in Example I but the other equipment was similar. To the reaction vessel was charged 1.6632 g. (0.0616 g. atom) aluminum, 99.99% pure, 150 ml. of dichloromethane which had been carefully dried by passing it through a molecular sieve column and 3.0 ml. of dibromomethane/aluminum reaction product prepared in a similar manner to that described in Example I. Again, dry nitrogen blanketing was used and the 10 mil aluminum sheet was cut into about ⅛″ squares before being charged to the reaction vessel. The reaction mixture was stirred and heated to reflux. After 21 hours of reflux, all of the aluminum had reacted to give a clear, yellow solution with only a trace of flocculent solids. The clear, yellow solution containing the desired product was decanted from the flocculent solids. The concentration of methylene bis(aluminum dichloride) is 1 millimole in 4.96 ml. of solution.

EXAMPLE IV

Next is described the polymerization of ethylene. For the polymerization a pressure vessel was used. To the reactor was charged 500 ml. of hexane and to a complexer about 75 ml. of hexane. Also, to the complexer was added 1.0 ml. (0.2 millimole) methylene bis(aluminum dichloride) solution from Example III and 0.05 ml. $VOCl_3$/dichloromethane solution containing $5 \times 10^{-6}$ moles of $VOCl_3$. The materials in the complexer were stirred for a few minutes and then the complexed catalyst was charged with additional hexane to give a total of 1 liter of hexane to the polymerization reactor. The materials in the reactor were stirred briefly and then the stirrer was turned off. The reactor was pressured to 41 p.s.i.g. with ethylene, to 56 p.s.i.g. with hydrogen and finally to 76 p.s.i.g. with ethylene, giving 20 mole percent hydrogen in the ethylene. The stirrer was turned on with the ethylene line open providing continuous ethylene feed to the polymerization reactor. The polymerization was run for 90 minutes without external heating or cooling. The reactor was then cooled, vented, flushed with nitrogen and opened. The reaction mixture was dumped and the polyethylene ground in a Waring Blender in hexane. The polyethylene was then isolated by filtering under vacuum. The polyethylene was treated with 50 ml. of IONOL in methanol (1 mg. of IONOL which is 2,6-di-tert-butyl-4-methylphenol per ml. of methanol. The polyethylene was dried overnight in a vacuum oven at 65° C. Yield of polyethylene was 85.1 g. representing 98,200 g. of solid polyethylene/g. of $VOCl_3$.

EXAMPLE V

This example describes the preparation of solid methylene bis(aluminum dibromide) and the use of this compound with $VOCl_3$ to polymerize ethylene. The same type of equipment was used in this example as was used in Example I, and the reaction was carried out in a similar manner.

To a 100 ml. round bottomed flask was charged 1.6798 g. (0.0623 g. atom) of aluminum, 50 ml. of dibromomethane and 1 crystal of iodine. The reaction mixture was heated for a few minutes until the iodine color disappeared and in another few minutes an exothermic reaction began. The heating mantle was removed, and the heated mixture refluxed vigorously until all of the aluminum had reacted. As soon as all of the aluminum had reacted, the mixture was cooled in an ice-water bath and stirred for about two hours until a considerable amount of precipitate was present. The dibromomethane was stripped off under vacuum at about room temperature or lower. To the dry methylene bis(aluminum dibromide) was added 50 ml. of hexane. The concentration of the compound in the hexane is then 1.6 ml./mM.-methylene bis(aluminum dibromide) or 0.32 ml. of slurry=0.2 mM. mols of methylene bis(aluminum dibromide).

This hexane slurry of methylene bis(aluminum dibromide) was then used with $VOCl_3$ to polymerize ethylene. The equipment for polymerization was similar to that described in Example IV and the polymerization was carried out in a similar manner.

0.32 ml. of methylene bis(aluminum dibromide) hexane slurry described in the previous paragraph ($2 \times 10^{-4}$ mol of methylene bis(aluminum dibromide)), 0.05 ml. of $VOCl_3$ ($5 \times 10^{-6}$ mol.) dissolved in methylene dichloride, and about 75 ml. of hexane were added to the complexer; the catalyst mixture and the complexer were stirred for 1½ hours and the color changes of the catalyst were completed in about 1 to 1¼ hours. The catalyst from the complexer was charged in the polymerization reactor along with sufficient hexane to give 1 liter. The polymerization reactor was charged in a usual manner with 50—50 mixture of ethylene and hydrogen and polymerization was carried out for 40 minutes at 90 p.s.i.g. in the usual fashion with the temperature rising from 48° C. to 60.5° C., and then dropping back to 52.5° C. during this period of time. The reactor was then vented and repressured with ethylene and polymerization continued for an additional 20 minutes at 90 p.s.i.g., and during this 20 minute period the temperature rose from 51.5° C. to 64.5° C. The reactor was then cooled, vented, flushed with nitrogen, and the reaction mixture dumped through the bottom drain in the usual fashion. The reactor was rinsed with 1 liter of hexane. The polyethylene was recovered from this mixture by filtering under vacuum and the polyethylene was treated in the usual manner with 40 mg. of IONOL in 40 ml. of hexane. The polyethylene was dried over a period of several days in a vacuum oven at 65° C. and the yield of dry polymer was 57.9 g. or 66,900 g. polymer/g. of $VOCl_3$.

Melt indexes of the polymer were an $I_2$ of 0.04 dg./min. (decigrams/minute) and an $I_{10}$ of 1.8 dg./min. giving an $I_{10}/I_2$ of 45. The melt index tests were standard tests used in the art, ASTM No. D1238–57T (condition E for the $I_2$).

$Cl_2AlCH_2AlCl_2$ and $I_2AlCH_2AlI_2$ can be separated from the $CH_2Cl_2$ and $CH_2I_2$ respectively in which they are prepared and slurried in hexane in a similar manner, if desired; however, slurries in hexane can perhaps best be prepared by conventional solvent exchange technique.

What is claimed is:

1. A process for making a compound of the formula $X_2MCH_2MX_2$ wherein M is a Group III–A metal and each X is a chlorine, bromine, or iodine atom comprising heating at a temperature sufficient to initiate the reaction M and $CH_2X_2$ with substantially no moisture present.

2. A process of claim 1 wherein methylene dibromide/M reaction product is used to initiate the reaction.

3. A process of claim 1 wherein M is aluminum, X is a chlorine atom and $n$ is 2.

4. A process of claim 2 wherein M is aluminum, X is a chlorine atom and $n$ is 2.

5. A process of claim 1 wherein iodine is used to initiate the reaction.

6. A process of claim 1 wherein M is aluminum, X is a bromine atom, $n$ is 2 and iodine is used to initiate the reaction.

7. A process of claim 1 wherein M is aluminum, X is an iodine atom and $n$ is 2.

References Cited

UNITED STATES PATENTS

| 2,033,055 | 3/1936 | Valik | 260—448 |
| 2,381,000 | 8/1945 | Patnode et al. | |
| 2,507,521 | 5/1950 | Clark. | |
| 3,109,838 | 11/1963 | Chatt et al. | |

OTHER REFERENCES

Chemical Abstracts, vol. 23, pp. 2931–32 (1929).
Chemical Abstracts, vol. 47, p. 4281 (1953).
Chemical Abstracts, vol. 55, p. 3417 (1961).
Chemical Abstracts, vol. 62, p. 2787( 1965).
Chemical Abstracts, vol. 64, p. 19820.
Whitmore: Organic Compounds of Mercury, The Chemical Catalog Co., Inc., New York, p. 26 (1922).
Lehmkuhl et al.: Tetrahedron Letters No. 21, pp. 2315–20 (1966).
Compt. Rend., vol. 183, pp. 665–67 (1926).
Compt. Rend., vol. 188, pp. 1555–57 (1929).

TOBIAS E. LEVOW, Primary Examiner

H. M. S. SNEED, Assistant Examiner

U.S. Cl. X.R.

252—431, 433; 260—94.9, 429, 429.7, 429.9, 431, 437, 448.2, 606.5, 665